US010863364B2

(12) United States Patent
Veeramallu et al.

(10) Patent No.: US 10,863,364 B2
(45) Date of Patent: Dec. 8, 2020

(54) METHODS AND APPARATUS FOR ENHANCED INFORMATION REPORTING

(71) Applicant: QUALCOMM Incorporated, San Diego, CA (US)

(72) Inventors: Subrahmanya Manikanta Veeramallu, Hyderabad (IN); Umesh Phuyal, San Diego, CA (US); Alberto Rico Alvarino, San Diego, CA (US); Praveen Kona, Hyderabad (IN); Mungal Singh Dhanda, Slough (GB); Srihari Vodnala, Adilabad (IN)

(73) Assignee: QUALCOMM Incororated, San Diego, CA (US)

( * ) Notice: Subject to any disclaimer, the term of this patent is extended or adjusted under 35 U.S.C. 154(b) by 102 days.

(21) Appl. No.: 16/016,334

(22) Filed: Jun. 22, 2018

(65) Prior Publication Data
US 2019/0028905 A1 Jan. 24, 2019

(30) Foreign Application Priority Data

Jul. 21, 2017 (IN) .............................. 201741026042

(51) Int. Cl.
| | |
|---|---|
| *H04W 16/26* | (2009.01) |
| *H04W 4/70* | (2018.01) |
| *H04W 76/18* | (2018.01) |
| *H04W 74/08* | (2009.01) |
| *H04L 29/08* | (2006.01) |
| *H04W 84/18* | (2009.01) |
| *H04W 24/08* | (2009.01) |
| *H04W 24/10* | (2009.01) |
| *H04W 8/22* | (2009.01) |

(52) U.S. Cl.
CPC ............. *H04W 16/26* (2013.01); *H04W 4/70* (2018.02); *H04W 74/0833* (2013.01); *H04W 76/18* (2018.02); *H04L 67/12* (2013.01); *H04W 8/22* (2013.01); *H04W 24/08* (2013.01); *H04W 24/10* (2013.01); *H04W 84/18* (2013.01)

(58) Field of Classification Search
CPC ....... H04W 16/26; H04W 4/70; H04W 76/18; H04W 74/0833
See application file for complete search history.

(56) References Cited

U.S. PATENT DOCUMENTS

2015/0117410 A1\* 4/2015 Wu ........................... H04L 1/08
370/331
2015/0271686 A1 9/2015 Jha et al.
(Continued)

FOREIGN PATENT DOCUMENTS

WO 2017099660 A1 6/2017

OTHER PUBLICATIONS

International Search Report and Written Opinion—PCT/US2018/043193—ISA/EPO—Oct. 19, 2018.

*Primary Examiner* — Ricky Q Ngo
*Assistant Examiner* — Stephen N Steiner

(57) ABSTRACT

Certain aspects of the present disclosure relate generally to communication systems, and more particularly, to enhanced reporting by user equipment (UE). An example method generally includes receiving an information request from a network node and in response, sending a message to the network node, wherein the message comprises information that allows the network node to determine a starting coverage enhancement (CE) level of the UE.

112 Claims, 7 Drawing Sheets

(56) References Cited

U.S. PATENT DOCUMENTS

| | | | |
|---|---|---|---|
| 2015/0271763 A1* | 9/2015 | Balachandran | H04B 17/23 370/338 |
| 2016/0295609 A1 | 10/2016 | Vajapeyam et al. | |
| 2017/0280481 A1* | 9/2017 | Stern-Berkowitz | H04L 5/0092 |
| 2018/0338303 A1* | 11/2018 | Jia | H04W 72/048 |

* cited by examiner

METHODS AND APPARATUS FOR ENHANCED INFORMATION REPORTING

CROSS-REFERENCE TO RELATED APPLICATION

This application for patent claims priority to India provisional application number 201741026042, filed Jul. 21, 2017, which is hereby incorporated by reference in its entirety.

FIELD

The present disclosure relates generally to communication systems, and more particularly, to enhanced information reporting by user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, wideband CDMA (W-CDMA) systems, time division multiple access (TDMA) systems, frequency division multiple access (FDMA) systems, orthogonal frequency division multiple access (OFDMA) systems, wide band single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. For example, 5G NR (new radio) communications technology is envisaged to expand and support diverse usage scenarios and applications with respect to current mobile network generations. In an aspect, 5G communications technology includes massive machine type communications (MTC) for a very large number of connected devices, and typically transmitting a relatively low volume of non-delay-sensitive information. However, as the demand for mobile broadband access continues to increase, there exists a need for further improvements in 5G communications technology and beyond. Preferably, these improvements should be applicable to other multi-access technologies and the telecommunication standards that employ these technologies.

Self-organization is the process where a structure or pattern appears in a system without a central authority or external element imposing it through planning. The vision of self-organizing networks (SON), which is in line with the views of 3GPP (3rd Generation Partnership Project), is that future radio access networks need to be easier to plan, configure, manage, optimize, and heal compared to how it used to be. SON has been codified by the 3GPP specifications in a series of standards. Newly added base stations should be self-configured in line with a 'plug-and-play' paradigm, while all operational base stations will regularly self-optimize parameters and algorithms behavior in response to observed network performance and radio conditions. Furthermore, self-healing mechanism can be triggered to temporarily compensate for a detected equipment outage, while awaiting a more permanent solution.

Next generation wireless technologies (e.g., 5G and beyond) will also rely on SON procedures to improve access to the network for a massive number of MTC devices. In particular, an increased complexity of random access procedures will necessitate adapted reporting methods. Therefore, there is a desire for a method and an apparatus for an enhanced random access channel and/or connection establishment failure (RACH/CEF) reporting procedure.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of enhanced reporting by a user equipment (UE) is provided. The UE may be operating in a machine-type communication (MTC) mode. MTC mode refers to a mode of operation wherein the UE engages in machine-type communication, such as for example, enhanced MTC (eMTC) communications, Narrowband Internet of Things (NB-IoT) communications, 5G New Radio (NR) IoT (LP-IoT (low power Internet of Things), massive IoT, etc.). The method generally includes: receiving an information request, relating to a random access procedure or a connection establishment procedure associated with the random access procedure, from a network node; and in response to the received information request, sending a message to the network node, wherein the message comprises information that allows the network node to determine a starting coverage enhancement (CE) level of the random access procedure.

According to an example, an apparatus for enhanced reporting by a UE is provided. The apparatus generally includes at least one processor configured to: receive an information request, relating to a random access procedure or a connection establishment procedure associated with the random access procedure, from a network node, and in response to the received information request, send a message to the network node, wherein the message comprises information that allows the network node to determine a starting coverage enhancement (CE) level of the random access procedure; and a memory coupled to the at least one processor.

According to an example, an apparatus for enhanced reporting by a UE is provided. The apparatus generally includes: means for receiving an information request, relating to a random access procedure or a connection establishment procedure associated with the random access procedure, from a network node; and means for, in response to the received information request, sending a message to the network node, wherein the message comprises information that allows the network node to determine a starting coverage enhancement (CE) level of the random access procedure.

According to an example, a computer-readable medium for enhanced reporting by a UE is provided. The computer-readable medium generally includes code, which when executed by at least one processor, causes the UE to: receive an information request, relating to a random access procedure or a connection establishment procedure associated with the random access procedure, from a network node; and in response to the received information request, send a message to the network node, wherein the message comprises information that allows the network node to determine a starting coverage enhancement (CE) level of the random access procedure.

According to an example, a method of enhanced reporting by a network node is provided. The method generally includes: sending an information request, relating to a random access procedure or a connection establishment procedure associated with the random access procedure, to a user equipment (UE); and receiving a message from the UE in response to the information request, wherein the message comprises information that allows the network node to determine a starting coverage enhancement (CE) level of the random access procedure.

According to an example, an apparatus for enhanced reporting by a network node is provided. The apparatus generally includes at least one processor configured to: send an information request, relating to a random access procedure or a connection establishment procedure associated with the random access procedure, to a user equipment (UE), and receive a message from the UE in response to the information request, wherein the message comprises information that allows the network node to determine a starting coverage enhancement (CE) level of the random access procedure; and a memory coupled to the at least one processor.

According to an example, an apparatus for enhanced reporting by a network node is provided. The apparatus generally includes: means for sending an information request, relating to a random access procedure or a connection establishment procedure associated with the random access procedure, to a user equipment (UE); and means for receiving a message from the UE in response to the information request, wherein the message comprises information that allows the network node to determine a starting coverage enhancement (CE) level of the random access procedure.

According to an example, a computer-readable medium for enhanced reporting by a network node is provided. The computer-readable medium generally includes code, which when executed by at least one processor, causes the network node to: send an information request, relating to a random access procedure or a connection establishment procedure associated with the random access procedure, to a user equipment (UE); and receive a message from the UE in response to the information request, wherein the message comprises information that allows the network node to determine a starting coverage enhancement (CE) level of the random access procedure.

Numerous other aspects are provided including methods, apparatus, systems, computer program products, computer-readable medium, and processing systems, for example, for performing techniques disclosed herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
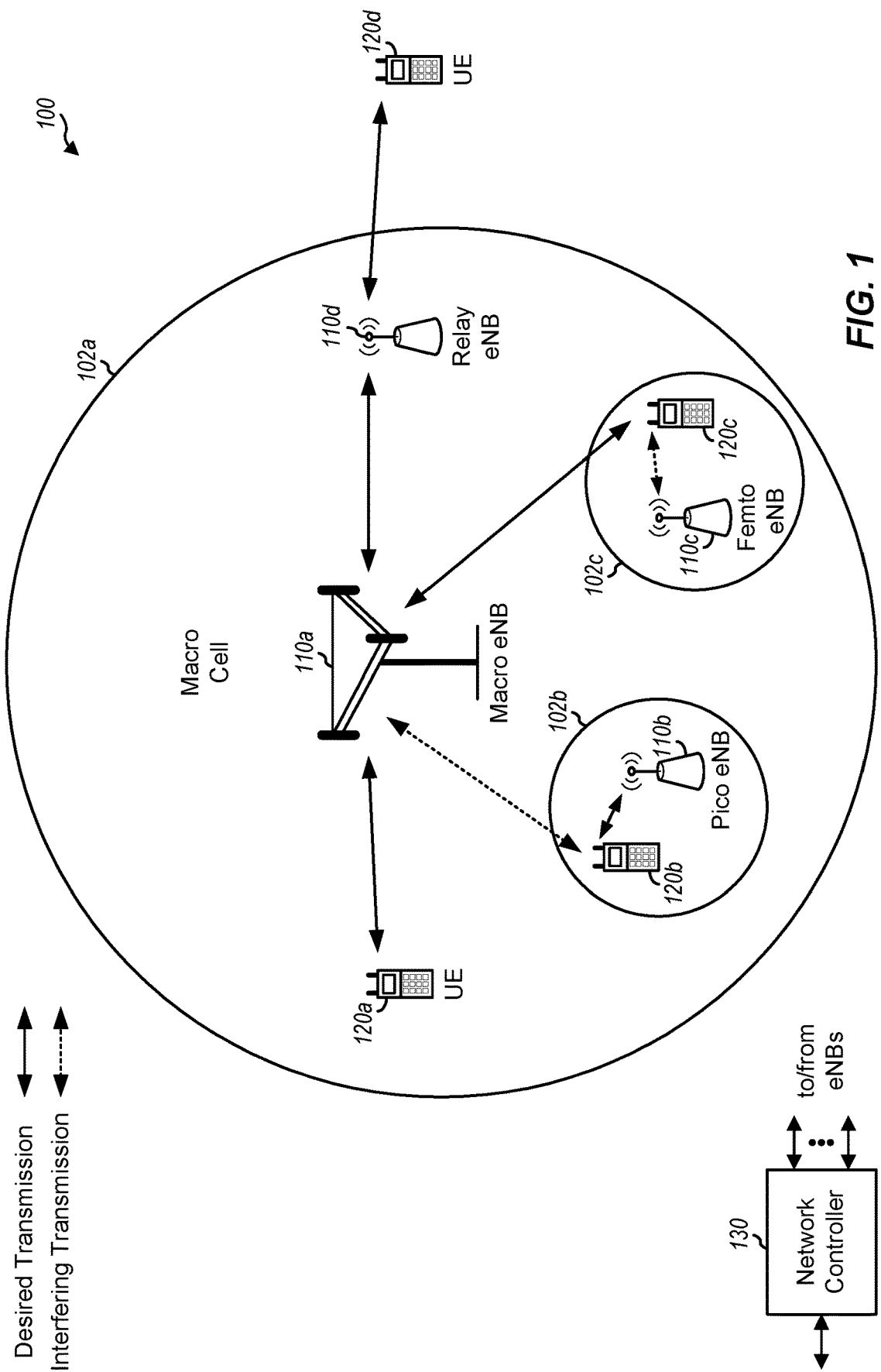
FIG. 1 is a block diagram conceptually illustrating an example of a wireless communication network, in accordance with certain aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Aspects of the present disclosure provide techniques for enhanced random access channel/connection establishment failure (RACH/CEF) reporting for, for example, Narrow-Band Internet-of-Things (NB-IoT) devices and Bandwidth reduced Low complexity/Coverage Enhancement (BL/CE) devices, which may be deployed in Self Organizing/Optimizing Networks.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are newer releases of UMTS that use E-UTRA, which employs OFDMA on the downlink and SC-FDMA on the uplink. NR (e.g., 5G radio access) is an example of an emerging telecommunication standard. NR is a set of enhancements to the LTE mobile standard promulgated by 3GPP. UTRA, E-UTRA, UMTS, LTE, LTE-A, NR, and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

A wireless communication network may include a number of network nodes that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, wearables (e.g., smart watch, smart bracelet, smart glasses, virtual reality goggles, smart ring, smart jewelry, smart clothing), displays (e.g., heads-up displays), healthcare/medical devices, vehicular devices, navigation devices, entertainment devices (e.g., music players, game consoles), etc. Some UEs may be considered machine-type communication (MTC) UEs, which may include remote devices, such as drones, robots/robotic devices, sensors, meters (water meters, electricity meters, meters for other types of measurements, etc.), location tags, etc., that may communicate with a network node such as a base station, another remote device, or some other entity. Machine type communications (MTC) may refer to communication involving at least one remote device on at least one end of the communication and may include forms of data communication which involve one or more entities that do not necessarily need human interaction. MTC devices, as well as other devices, may include Internet of Things (IoT) (e.g., eMTC, NB-IoT) devices, and techniques disclosed herein may be applied to IoT devices (e.g., eMTC devices, NB-IoT devices, etc.), as well as other devices.

Some next generation, New Radio (NR), or 5G and beyond networks may include a number of base stations, each simultaneously supporting communication for multiple communication devices, such as UEs. In LTE or LTE-A network, a set of one or more BSs may define an evolved Node B (eNB). In other examples (e.g., in a next generation or 5G network), a wireless multiple access communication system may include a number of distributed units (e.g., edge units (EUs), edge nodes (ENs), radio heads (RHs), smart radio heads (SRHs), transmission reception points (TRPs), etc.) in communication with a number of central units (e.g., CU, central nodes (CNs), access node controllers (ANCs), etc.), where a set of one or more distributed units (DUs), in communication with a CU, may define an access node (e.g., AN, a new radio base station (NR BS), a NR NB, a gNB (next generation Node B), a 5G BS, an access point (AP), etc.). A BS or DU may communicate with a set of UEs on downlink channels (e.g., for transmissions from a BS or to a UE) and uplink channels (e.g., for transmissions from a UE to a BS or DU). A network node generally refers to an element in a network, such as a base station, an eNB, a gNB, an access point, an access node, a femto cell, a pico cell, a home eNB (HeNB), a mobility management entity (MME), CUs, CNs, access management function (AMF), session management function (SMF), etc., whether physical or virtual. Depending on the context, a channel may refer to the channel on which signaling/data/information is transmitted or received, or to the signaling/data/information that is transmitted or received on the channel.

It is noted that while aspects may be described herein using terminology commonly associated with 4G wireless technologies, aspects of the present disclosure can be applied in other generation-based communication systems, such as 5G and later.

Example Wireless Communications Network

FIG. 1 illustrates an example wireless communication network 100, in which aspects of the present disclosure may be practiced. For example, techniques presented herein may be used to perform enhanced reporting operations for UEs in coverage enhancement. In aspects, one or more of the UEs 120 (e.g., IoT devices) in the network 100 may have capabilities that are different compared to other UEs 120 in the network 100. In one example, some of the UEs 120 may have the capability to support narrowband operations (for eMTC, NB-IoT, etc.).

In aspects, a network node (e.g., base station 110) may determine different sets of resources that are available for narrowband communications with one or more different sets of UEs 120 (e.g., IoT devices). Each set of UEs 120 may include UEs of a particular type (or capability) (e.g., such as whether the UEs support multiple PRB operations for NB IoT). The base station (BS) 110 may allocate the different sets of resources to the UEs 120 in the different sets based, at least in part, on the type of UEs 120. Once allocated, the base station 110 may transmit an indication of the allocation to the UEs 120.

The network 100 may be an LTE network or some other wireless network, such as NR network. Wireless network 100 may include a number of base stations 110 and other network nodes. A base station (BS) is a network node that communicates with user equipments (UEs) and may also be referred to as a Node B, an evolved Node B (eNB), a NR BS, a 5G BS, a gNB, an access point, a femto cell, etc. Each BS may provide communication coverage for a particular geographic area. In 3GPP, the term "cell" can refer to a coverage area of a base station and/or a base station subsystem serving this coverage area, depending on the context in which the term is used.

An eNB or gNB, for example, may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, a base station 110a may be a macro eNB for a macro cell 102a, a base station 110b may be a pico eNB for a pico cell 102b, and a base station 110c may be a femto eNB for a femto cell 102c. A base station may support one or multiple (e.g., three) cells.

The terms "eNB", "gNB", "base station", "network node", and "cell" may be used interchangeably herein.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay station 110d may communicate with macro base station 110a and a UE 120d in order to facilitate communication between base station 110a and UE 120d. A relay station may also be referred to as a relay base station, a relay gNB, a relay eNB, a relay, etc.

Wireless network 100 may be a heterogeneous network that includes base stations of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. In FIG. 1, a solid line with double arrows indicates desired transmissions between a UE and a serving base station, which is an base station designated to serve the UE on the downlink and/or uplink. A dashed line with double arrows indicates potentially interfering transmissions between a UE and a base station.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Rel-12) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

Narrowband UEs may be limited to a particular narrowband assignment, for example, of 1.4 MHz or six resource blocks (RBs) for eMTC, or of 200 kHz or one RB for NB-IoT, partitioned out of the available system bandwidth) while co-existing within a wider system bandwidth (e.g., at 1.4/3/5/10/15/20 MHz). Additionally, narrowband UEs may also be able to support one or more coverage modes of operation. Certain standards (e.g., LTE Release 13) have support for various additional enhancements. For example, the narrowband UE may be able to support coverage enhancements up to 15 dB.

As used herein, devices with limited communication resources, e.g. smaller bandwidth relative to non-bandwidth limited devices, may be referred to generally as narrowband UEs. Similarly, devices, e.g., legacy devices and/or advanced devices (e.g., in LTE or 5G), that are non-bandwidth limited may be referred to generally as wideband UEs. Generally, wideband UEs are capable of operating on a larger amount of bandwidth than narrowband UEs.

In some cases, a UE (e.g., a narrowband UE or a wideband UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
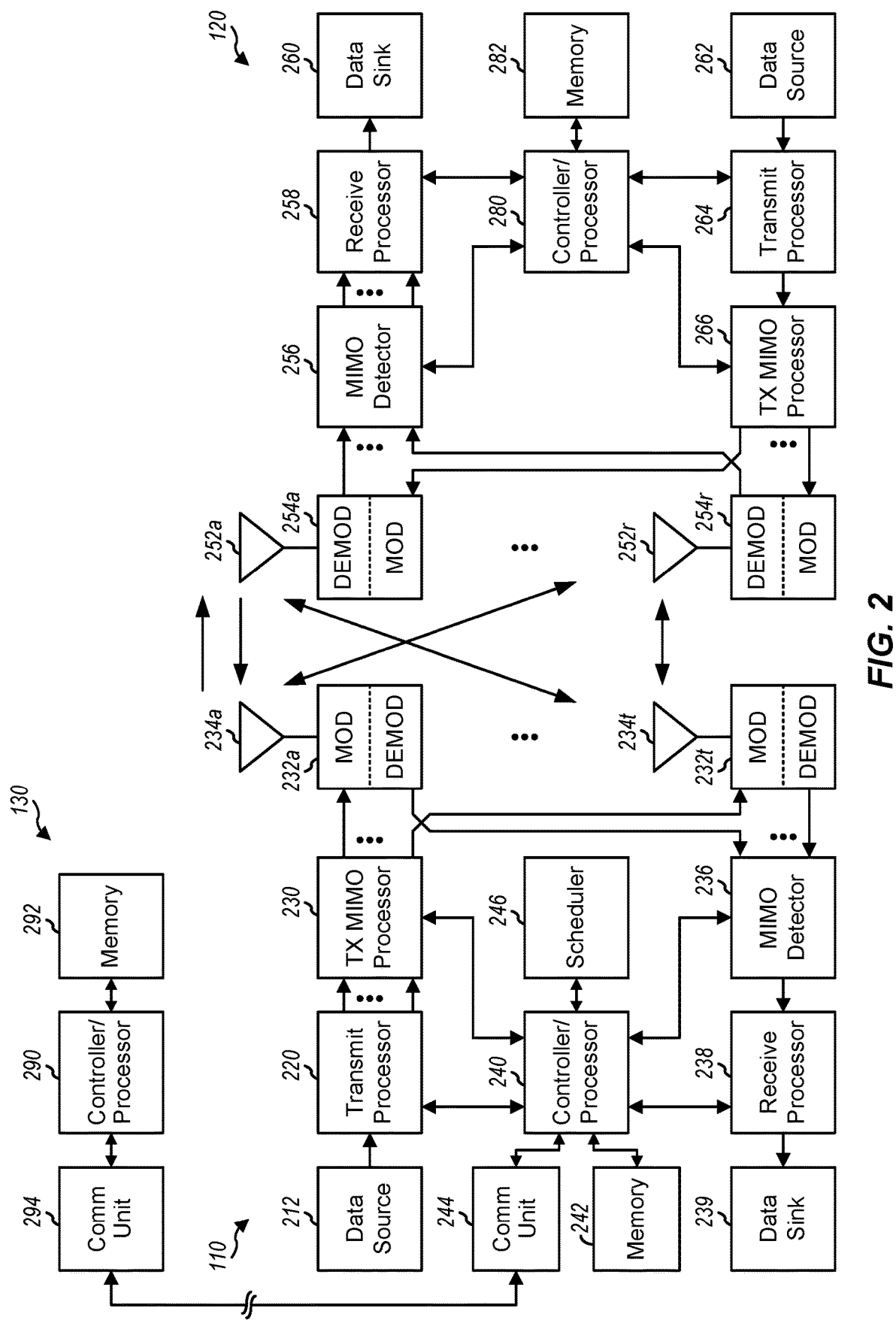
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively, to perform techniques presented herein for paging and/or random access procedures for narrowband IoT with multiple PRBs. For example, processor 240 and/or other processors and modules at base station 110, and processor 280 and/or other processors and modules at UE 120, may perform or direct operations of base station 110 and UE 120, respectively. For example, controller/processor 280 and/or other controllers/processors and modules at UE 120 may perform or direct UE operations 300 in FIG. 3, operations 400 in FIG. 4, UE operations 500 in FIG. 5, and operations 600 in FIG. 6. Similarly, controller/processor 240 and/or other controllers/processors and modules at BS 110 may perform or direct BS operations 300 in FIG. 3, BS operations 500 in FIG. 5, and operations 700 in FIG. 7. Memories 242 and 282 may store data and program codes for base station 110 and UE 120, respectively. A scheduler 246 may schedule UEs for data transmission on the downlink and/or uplink.

Random Access

In cellular systems, a terminal may request a connection setup, commonly referred to as random access. In LTE, for example, random access is used for several purposes, including (but not limited to):

for initial access when establishing a radio link;
to re-establish a radio link radio-link failure; and
for handover when uplink synchronization needs to be established to the new cell.

Acquisition of uplink timing is often an important objective for all the cases above. When establishing an initial radio link, the random access procedure also serves the purpose of assigning a unique identity, the C-RNTI (Cell-Radio Network Temporary Identifier), to the terminal. Either a contention-based or contention-free random access procedure can be used. Contention-based random access uses a four-step procedure, and contention-free random access procedure uses a three-step procedure.

Figure 3:
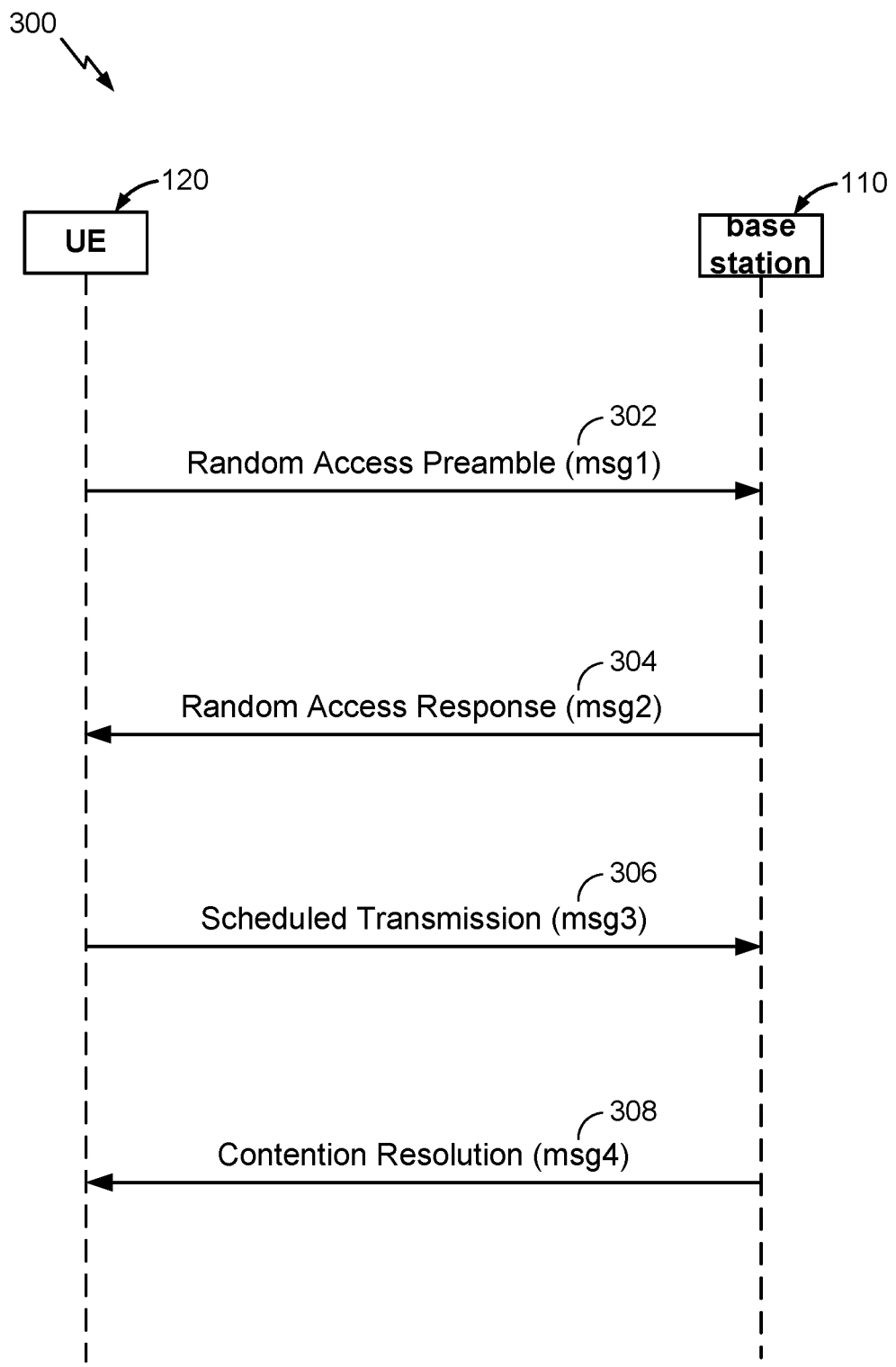
FIG. 3 is a call flow diagram illustrating the steps of a random access procedure in LTE, in accordance with certain aspects of the present disclosure.

FIG. 3 illustrates the four steps of a contention-based random access procedure 300. In a first step 302, UE 120 transmits a random access preamble (msg1) on the Physical Random Access Channel (PRACH), allowing BS 110 to estimate the transmission timing of the UE. In a second step 304, the network transmits a random access response (msg2) including a timing advance command to adjust the terminal transmit timing, based on the timing estimate obtained in the first step. In addition to establishing uplink synchronization, the second link also assigns uplink resources to the terminal to be used in a third step 306 of the random access procedure. At 306, UE 120 transmits msg3 including mobile-terminal identity information using the uplink shared channel (UL-SCH) similar to normal scheduled data. The exact content of this signaling may depend on the state of the terminal, particular whether it is previously known to the network or not. Msg3 may include a RRC connection request. With the RRC connection request, the random access procedure initiates an associated connection establishment procedure. The fourth step 308 includes the transmission of a contention resolution message (msg4) from BS 110 to UE 120 on the downlink shared channel (DL-SCH). This step resolves any contention due to multiple terminals trying to access the network using the same random access resource and concludes the contention-based random access procedure. For a contention-free random access procedure, the UE should already be in RRC connected mode. As a first step of the contention-free random access procedure, a random access preamble is assigned to the UE by a network node. The preamble is dedicated to the UE for random access and not used by other UEs, and contention is avoided. In a second step, the UE transmits the assigned random access preamble to the network node. In a third step, the network node transmits the random access response to the UE, concluding the contention-free random access procedure.

Self-Organising Network

An important feature of Self-Organizing Networks (SON) in LTE systems is RACH reporting. RACH performance historically has relied on drive testing to quantify, as a failed procedure is not recorded by the network, and the network is not aware of the number of preambles/contention for a successful case as well. With RACH reporting the UE can be requested to report how many preambles it used to access the network and if it encountered any contention. In a basic implementation, this information can simply be recorded statistically for an operator to look at. In a full SON implementation, the requested preamble power can be adjusted up or down, depending on whether UEs are reporting too many preambles or too few. More RACH signatures can be assigned if contention is widely reported.

Figure 4:
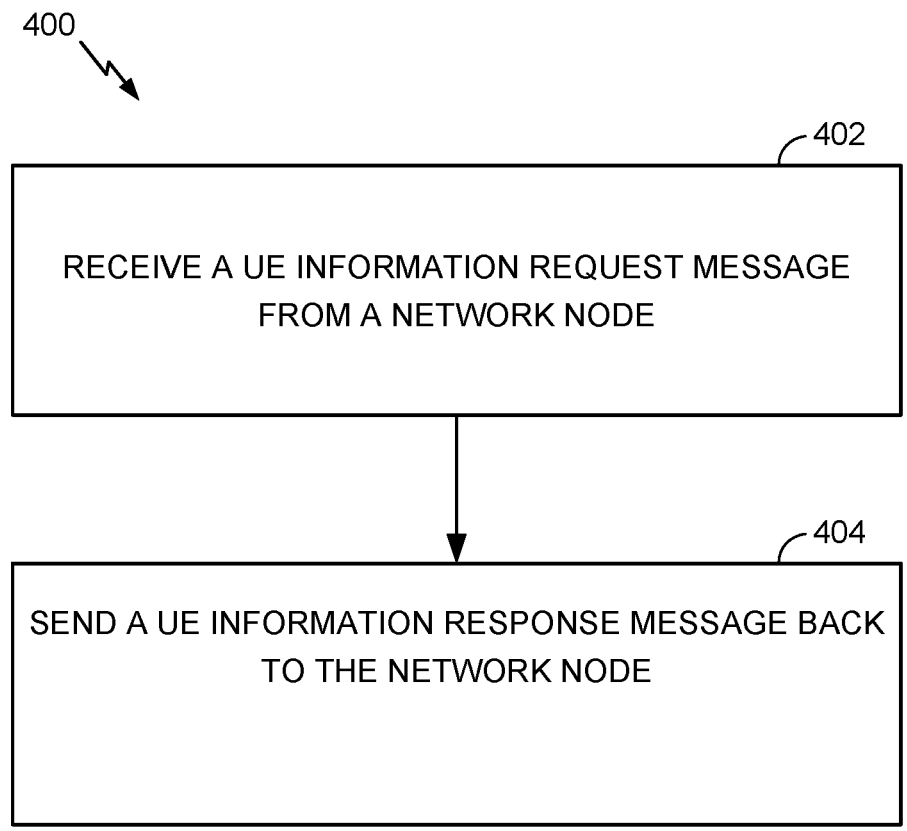
FIG. 4 is a flow diagram illustrating example operations for RACH reporting by a UE, in accordance with certain aspects of the present disclosure.

FIG. 4 illustrates the steps of an information reporting procedure 400 performed by a legacy-LTE UE. The procedure itself starts with the UE reporting its support (not shown). The network can then request from the UE to report information (e.g., about a RACH procedure, connection establishment failure, etc.) through a UE information request 402. As used herein, the term UE information request refers to a communication sent to the UE to request information, such as for example, information regarding the result of a procedure such as random access procedure, connection establishment procedure, etc. This information request is indicated by the network in an information request element sent to the UE. The UE information request is a message referred to as a UEInformationRequest message. This message is used by the base station to request or retrieve information from the UE. The request for the UE to report information about a RACH procedure may be indicated by setting the parameter rach-ReportReq to .TRUE. in the UEInformationRequest message. In response to the UE information request, the UE reports the result in a UE information response message 404. As used herein, the term UE information response refers to a communication that provides information that is responsive to an information request. This UE information response message 404 may include, for example, information that indicates how many preambles were sent during the last successful random access procedure, whether a contention failure occurred during the procedure (indicated by .TRUE.), etc. As an example, the UE information response is a message referred to as a UEInformationResponse message, and this message is used by the UE to transfer the information requested by the base station. The requested information about the RACH procedure is provided in an rach-Report information element. These reports may be referred to as SON reports. Similar SON reports can be requested by the network regarding other events and/or procedures, such as radio link failure (RLF) report, minimization of drive test (MDT) report, and connection establishment failure (CEF) report. A CEF report contains connection establishment failure information and is requested by the network, e.g., by indicating the request in UEInformationRequest message sent to the UE. The request for the CEF report containing CEF information is indicated by setting the parameter connEstFailReportReq to .TRUE. in the UEInformationRequest message. UE sends the CEF report in the connEstFailReport information element in the UEInformationResponse message.

For MTC devices, such as BL/CE UEs or NB-IoT UEs, or other devices enabled for enhanced coverage, the RACH procedure follows an overall protocol that may be similar to the one followed by legacy LTE devices, with a few important differences. The first difference is that some of the messages exchanged between the UE and the base station may be transmitted in repetition, in order to compensate for the often poor signal environment, e.g., low SNR (signal to noise ratio), at which these UEs operate. The second difference is the introduction of coverage enhancement levels (CE levels), which define different PRACH configurations and message repetition patterns. For example, a UE may determine its current CE level, from a number of possible choices (e.g., CE level 0 to CE level 3), based on the current measured RSRP (Reference Signal Received Power) and thresholds provided by the base station.

CE operation may be categorized into four CE levels (e.g., CE levels 0, 1, 2, 3) according to standard. CE levels 0 and 1 may correspond to CE Mode A, and CE levels 2 and 3 may correspond to CE Mode B. CE Mode A is designed for moderate coverage conditions, and CE Mode B is designed for more extreme coverage conditions and may be applicable for CINR<−6 dB to −18 dB. For example, if the most recent PRACH CE level for a UE is 0 or 1, contents of the random access response grant are interpreted according to CE Mode A, and if the most recent PRACH CE level for a UE is 2 or 3, contents of the random access response grant are interpreted according to CE Mode B. For example, CE levels may be related to PRACH resources (e.g., which ones to select), repetition/hopping parameters, etc. As CE levels increase, for example, amount of repetitions (e.g., of DL/UL transmissions), amount of transmission attempts, or transmission power, etc., may increase to provide enhanced coverage. The higher the CE level, the higher the number of random access preamble (msg1) repetitions, to allow for a better decoding ability by the base station. CE levels may be chosen during, e.g., initial access or handover (HO).

Figure 5:
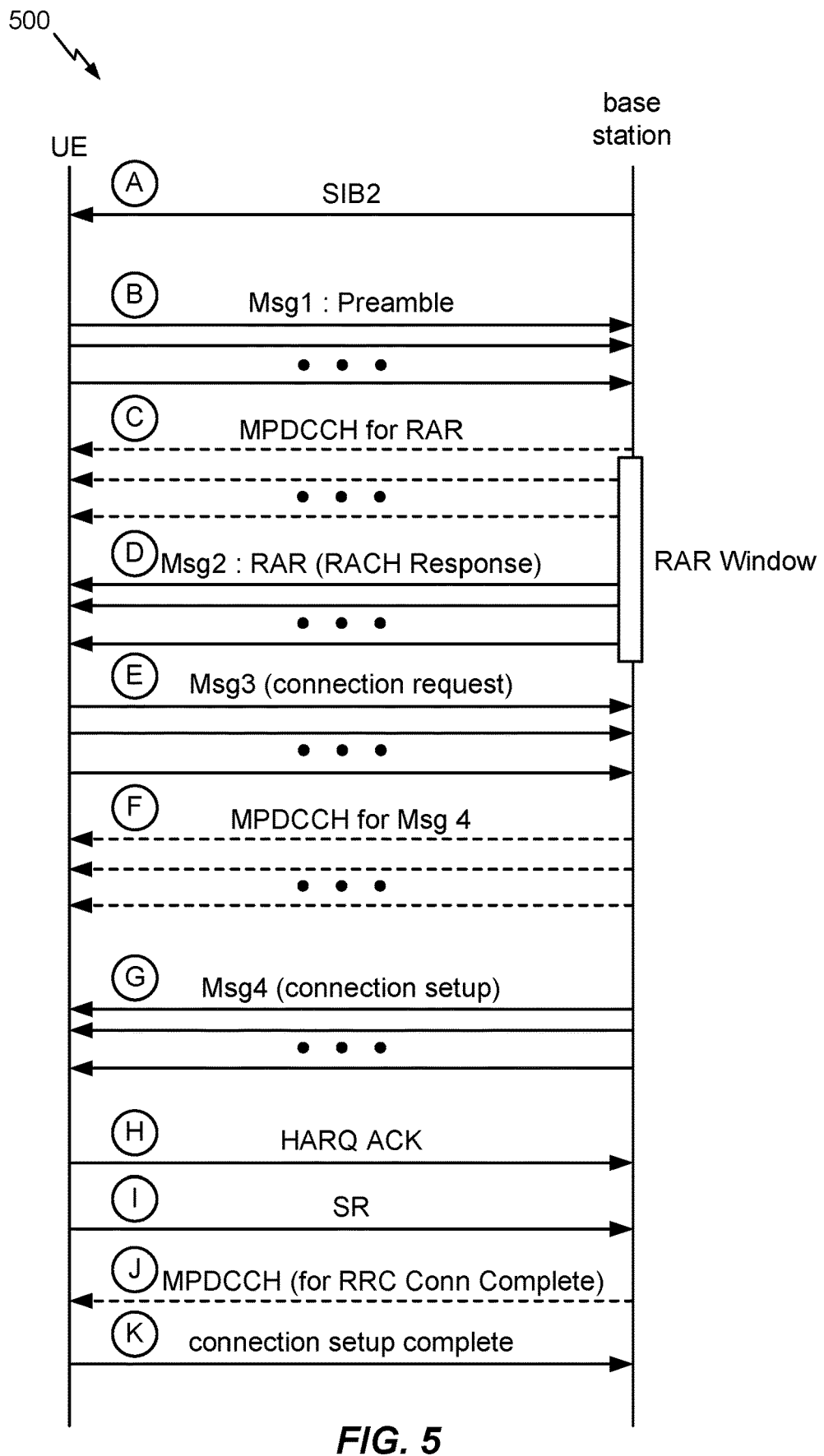
FIG. 5 is a call flow diagram illustrating the steps of an access procedure and a connection establishment procedure associated with the access procedure for a UE, in accordance with certain aspects of the present disclosure.

FIG. 5 illustrates the steps of an example procedure 500 involving random access procedure and an associated connection establishment procedure for an IoT or MTC device such as a BL/CE UE or a NB-IoT UE. The UE may be UE 120 and the base station may be BS 110 illustrated in FIG. 2. A connection establishment procedure (e.g., RRC connection establishment procedure) may be used to transition the UE from idle mode (e.g., RRC idle mode) to connected mode (e.g., RRC connected mode). UE may need to transition to RRC connected mode before transferring application data, for example. In step A, the base station transmits parameters used for basic PRACH configuration via SIB2 (System Information Block 2). The UE determines what kind of PRACH resource (time, frequency, preamble ID, etc.) to use based on the information received via SIB2, and it determines the appropriate CE level based on the measured RSRP. In step B, random access preambles (Msg1) are transmitted with repetition by the UE. The maximum number of preambles/Msg1 to be sent at a CE level may be given by a parameter, such as maxNumPreambleAttemptCE, defined for each CE level. The number of repetitions of each preamble/Msg1 may be given by a parameter such as numRepetitionPerPreambleAttempt. If the UE fails after maxNumPreambleAttemptCE attempts at a given CE level, it moves to the next CE level and tries again. In step C, the base station may indicate resources for a random access response (RAR) through MPDCCH, the MPDCCH transmitted with repetition. In step D, the base station transmits the RAR (Msg2), with repetition. In step E, UE transmits Msg3, with repetition. Msg 3 may correspond to a connection request, such as RRC (radio resource control) connection request, which begins the connection establishment procedure. Uplink resource allocation for the RRC connection request may be signaled within the RAR. A timer (such as T300 timer) is started based on certain conditions, such as transmission of the RRC connection request and is stopped upon reception of a RRC connection setup message or a RRC connection reject message, cell re-selection, or abortion of connection establishment by upper layers. The timer's value may be broadcast as system information, such as within SIB 2. If the timer expires before UE receives a RRC connection setup message, RRC connection establishment is considered to be a failure, and connection establishment failure information is stored by the UE, and this information may be reported in a CEF report requested by network. Upon receiving an RRC connection setup message, UE may stop the timer and transition to RRC connected mode. The UE may then proceed to complete the RRC connection establishment procedure by sending an RRC Connection Setup Complete message. In step F, base station may transmit MPDCCH for Msg4 (contention resolution), with repetition. In Step G, base station transmits Msg 4, with repetition. Base station may transmit a connection setup message (e.g., RRC connection setup message) with Msg4. In step H, UE acknowledges receipt of transmission by HARQ (hybrid automatic repeat request) Ack (acknowledgement). In step I, UE requests uplink resources for RRC connection complete message via scheduling request (SR). In step J, base station may transmit MPDCCH for the RRC connection complete message. In step K, UE transmits the connection setup complete message (e.g., RRC connection setup complete message), completing the connection establishment procedure.

An appropriate RACH report for a BL/CE UE or a NB-IoT UE should be able to convey the correct number of Msg1 used to reach the base station, along with the number of repetitions. The base station will be able to deduce a start CE level and, accordingly, the number of Msg1 repetitions used by a UE for most of the cases when the maximum number of preamble attempts per CE level (e.g., maxNumPreambleAttemptCE parameter) is the same for different CE levels. However, in a few cases highlighted in Table 1 below, an ambiguity may arise and the base station is unable to deduce the correct start CE level and the total number of Msg1 repetitions used by the UE during the last successful RACH process. Table 1 shows, for each total number of preambles reported, the possible combinations of preambles per CE level and the corresponding start CE level. For example, for total number of preambles=9, 10, 16, 17, 18, 22, 23, 24, or 25, two combinations of number of preambles per CE level et corresponding start CE level, are possible.

when the maxNumPreambleAttemptCE parameter increases with increased CE level, for at least two CE levels (Situation 2).

In an example of Situation 1, the same maxNumPreambleAttemptCE parameter may be chosen, as shown below:

maxNumPreambleAttemptCE 0 = n4
maxNumPreambleAttemptCE 1 = n4
maxNumPreambleAttemptCE 2 = n4
maxNumPreambleAttemptCE 3 = n4

If the UE succeeds its RACH attempt at CE level 3 after using more than n4 preamble repetitions (as allowed if the T300 timer has not expired), then the base station will be unable to deduce the correct start CE level.

In an example of Situation 2, a worst case scenario could be when the maxNumPreambleAttemptCE parameter increases for each CE level and the UE succeeds its RACH attempt at the last configured CE level (CE level 3), as shown below:

maxNumPreambleAttemptCE 0 = n6
maxNumPreambleAttemptCE 1 = n7
maxNumPreambleAttemptCE 2 = n8
maxNumPreambleAttemptCE 3 = n10

Here again the base station could be unable to deduce the correct start CE level. For instance, looking at the row

TABLE 1

| Total Number of Preambles | Possible Combo 1 (CE3, CE2, CE1, CE0) | Start CE Level | Possible Combo 2 (CE3, CE2, CE1, CE0) | Start CE Level |
|---|---|---|---|---|
| 1 | (1, 0, 0, 0) | CE3 | | |
| 2 | (2, 0, 0, 0) | CE3 | | |
| 3 | (3, 0, 0, 0) | CE3 | | |
| 4 | (4, 0, 0, 0) | CE3 | | |
| 5 | (5, 0, 0, 0) | CE3 | | |
| 6 | (6, 0, 0, 0) | CE3 | | |
| 7 | (7, 0, 0, 0) | CE3 | | |
| 8 | (8, 0, 0, 0) | CE3 | | |
| 9 | (9, 0, 0, 0) | CE3 | (1, 8, 0, 0) | CE2 |
| 10 | (10, 0, 0, 0) | CE3 | (2, 8, 0, 0) | CE2 |
| 11 | (3, 8, 0, 0) | CE2 | | |
| 12 | (4, 8, 0, 0) | CE2 | | |
| 13 | (5, 8, 0, 0) | CE2 | | |
| 14 | (6, 8, 0, 0) | CE2 | | |
| 15 | (7, 8, 0, 0) | CE2 | | |
| 16 | (8, 8, 0, 0) | CE2 | (1, 8, 7, 0) | CE1 |
| 17 | (9, 8, 0, 0) | CE2 | (2, 8, 7, 0) | CE1 |
| 18 | (10, 8, 0, 0) | CE2 | (3, 8, 7, 0) | CE1 |
| 19 | (4, 8, 7, 0) | CE1 | | |
| 20 | (5, 8, 7, 0) | CE1 | | |
| 21 | (6, 8, 7, 0) | CE1 | | |
| 22 | (7, 8, 7, 0) | CE1 | (1, 8, 7, 6) | CE0 |
| 23 | (8, 8, 7, 0) | CE1 | (2, 8, 7, 6) | CE0 |
| 24 | (9, 8, 7, 0) | CE1 | (3, 8, 7, 6) | CE0 |
| 25 | (10, 8, 7, 0) | CE1 | (4, 8, 7, 6) | CE0 |
| 26 | (5, 8, 7, 6) | CE0 | | |
| 27 | (6, 8, 7, 6) | CE0 | | |
| 28 | (7, 8, 7, 6) | CE0 | | |
| 29 | (8, 8, 7, 6) | CE0 | | |
| 30 | (9, 8, 7, 6) | CE0 | | |
| 31 | (10, 8, 7, 6) | CE0 | | |

The ambiguous cases highlighted (by bold and underlined font) above can occur in two situations:
  when the UE uses more than maxNumPreambleAttemptCE repetitions in the last configured CE level (Situation 1); or corresponding to a Total number of Preambles equal to 22, in Table 1, that total number could be obtained starting at CE level 1 and going through 7, 8, and 7 preambles respectively at levels CE1, CE2, and CE3. Alternatively, the same total number of 22 preambles could be obtained starting at CE level 0 and going through 6, 7, 8, 1 preambles respectively at levels CE0, CE1, CE2, and CE3.

A disambiguation parameter may, for example, be used to distinguish between these possible combinations. As used herein, the term "disambiguation parameter" refers to a parameter that may be used to help distinguish between different possibilities. Further, as used herein, the term "disambiguation Information Element" refers to an information element or other parameter that includes a disambiguation parameter. A starting CE level parameter (e.g., a "startCELevel" Information Element) may be used, for example, as disambiguation parameter in the RACH report. With the inclusion of this information, for example, the base station will be able to successfully (e.g., unambiguously) deduce or determine how many CE levels a UE traversed and the total number of Msg1 repetitions used during that UE's last successful RACH process. As another example, the base station will be able to successfully deduce or determine how many CE levels a UE traversed during the last connection establishment failure. For example, for the situation in the Table 1 row corresponding to a Total Number of Preambles equal to 22, if the UE's starting CE level is CE 1, the UE can set the starting CE level parameter to indicate CE 1, and if the UE's starting CE level is CE 0, the UE can set the starting CE level parameter to indicate CE 0. The starting CE level may be indicated in the form of a number, a bit map, a set of Boolean values, flags, etc. The inclusion of this type of parameter, such as startCELevel IE (information element), has the added advantage that the base station is able to determine the downlink RSRP measured by the UE during its last successful RACH process as, generally, the starting CE level determination is based on configured RSRP thresholds.

A legacy base station would not be able to determine downlink RSRP conditions during a successful RACH/attach process, as no measurement event can be configured before establishing Signaling Radio Bearers (SRBs). A RACH report from a BL/CE or NB-IOT UE, as disclosed herein, would therefore be similar to a measurement report that would be obtained before SRB establishment.

Techniques disclosed herein, such as combining a conventional report with information (such as start CE level or other parameters) that enable a base station to correctly determine the starting CE level of a UE for a procedure (e.g., access procedure such as random access, connection establishment procedure such as RRC connection establishment, etc.), allow enhanced network operation and planning. In an aspect, such enhanced reporting provides information about the coverage enhancement levels the UE went through in order to complete the procedure successfully, therefore enabling a more complete assessment of the dynamic downlink channel conditions during the last successful UE procedure. For example, using such feedback from UEs, the base station can fine-tune its RSRP thresholds and PRACH configurations for each of the CE levels. This, in turn, would help achieve better BL/CE/NB-IoT network operation.

In addition, BL/CE/NB-IoT UEs are generally used in less mobile/stationary applications like parking/water/gas/electricity metering, city street lighting, industrial monitoring and control, telematics, insurance, asset & vehicle tracking, etc. If a device ID is tagged or otherwise associated with a geographic location, the report will be able to convey RSRP conditions at a particular location during a last successful random access or connection establishment procedure at different times of the day/week/month/year.

If there is no provision for geo-tagging of the device, the report may be configured to include location information, e.g., by sending an "includelocationInfo" command, similar to the one used for Connection Establishment Fail (CEF) reports, Radio Link Failure (RLF) reports, and other measurement reports. As a response, the RACH report sent by the UE may include location information (e.g., a locationInfo IE) if available.

In a further aspect, if a contention resolution failure is detected during the last successful RACH procedure, the UE can also indicate the CE level at which contention failure occurred, for example, using a parameter indicating "contentionDetected at CE Level x" (e.g., using a new IE contentionDetectedAtCE::=ENUMERATED {CE0, CE1, CE2, CE3}).

The disclosed techniques, such as those associated with "startCELevel" and "contentionDetected at CELevel x", can be extended to the last failed RACH or connection establishment procedure, by the inclusion of this type of information in an information element, such as connEstFailReport as an example.

Additionally, as an alternate solution to solve the ambiguous cases previously described, when the UE, for example, uses more than maxNumPreambleAttemptCE in the last configured CE level, the starting CE level can be deduced by including in the RACH report the number of preambles sent in the last configured CE level (e.g., the CE level at which the random access procedure was successful or at which connection establishment failed).

Similarly, if the maxNumPreambleAttemptCE parameter increases with increasing CE levels, at least for two CE levels, then the starting CE level can be deduced by the base station using the number of preambles sent in the last configured CE level.

In both example cases, if the number of preambles sent in the last successful/configured CE level is included in the RACH report, then the base station can deduce the start CE level, that is, the number of preambles sent in the last/successful CE level can be used as disambiguation parameter to deduce the parameter "startCELevel." For example, since base station already has information from UE about the total number of random access preambles sent during the random access procedure, as well as information about the maximum number of random access preambles to be attempted for each CE level, the base station may determine the UE's starting level as follows: subtract the number of preambles sent in the last configured CE level from the total number of preambles sent during the access procedure, resulting in the number X. If X is 0, then the starting CE level is the last configured CE level. If X>0, then subtract the maximum number of preamble attempts for the immediate prior CE level from X, resulting in a number Y. If Y>0, then subtract the maximum number of preamble attempts for the next prior CE level from Y; otherwise, the immediate prior CE level is the starting CE level. This process is repeated until the starting CE level is determined.

Figure 6:
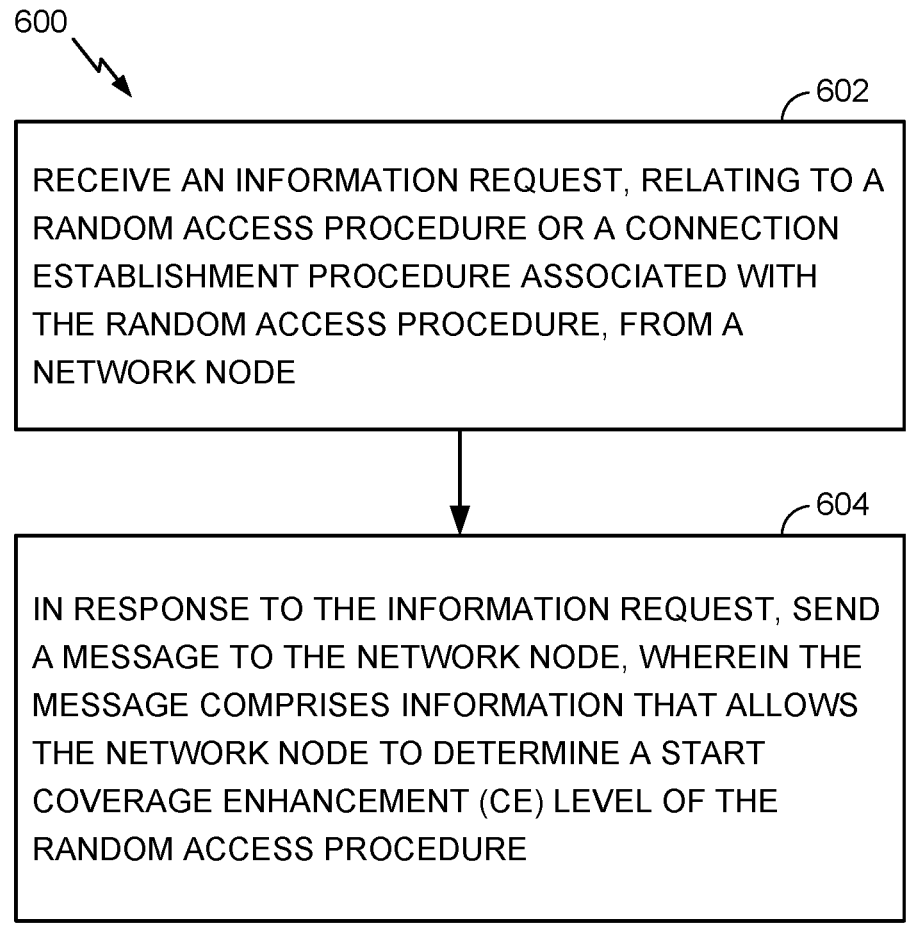
FIG. 6 is a flow diagram illustrating example operations for enhanced information reporting by a UE, in accordance with certain aspects of the present disclosure.

FIG. 6 illustrates the steps of an enhanced reporting procedure 600 performed by a device, such as a BL/CE, eMTC, or NB-IoT UE, or a UE that is otherwise in coverage enhancement mode. For example, the device may be UE 120, and the network node may be base station 110. The procedure starts at 602 with the UE receiving an information request from a network node, e.g., to report information about a procedure. The information request may be in the form of a UE information request message. The information request may be in connection with, for example, an access procedure (e.g., random access procedure) or a connection establishment procedure (e.g., RRC connection establishment procedure). The connection establishment procedure may be associated with the access procedure because, for example, the access procedure initiates the connection establishment procedure. For example, the information request may comprise a request for a RACH report or a connection establishment failure (CEF) report (e.g., if the connection establishment procedure failed). The connection establishment failure may comprise or may be indicated by the expiration of a timer. The network node may be a port of a SON. The UE sends, at 604, a message to the network node in response to the received information request. The message may comprise information that allows the network node to determine (e.g., unambiguously) a start CE level of the access procedure. The message may be a report (such as a RACH report or a CEF report), and it may be in the form of a UE information response message. The message may include, for example: —the starting CE level of the access procedure; —total number of random access preambles sent by the UE in a CE level at which the access procedure was successfully completed; —how many total preambles were sent at each CE level during the access procedure (e.g., the last successful access procedure); —an indication of whether contention was detected during the access procedure; —whether a contention failure occurred during the procedure (indicated by a .TRUE. flag); —a parameter that allows the network node to deduce one or more additional parameters (e.g., a parameter that allows the network node to deduce the starting CE level of the access procedure, such as the number of preambles sent in the last configured CE level as described above), etc. For example, the starting CE level of a random access procedure comprises the CE level of the UE at which the UE transmitted at least one random access preamble to start the random access procedure. The random access procedure may include the UE sending random access preambles according to a scheme associated with a CE level of the UE based on measured Reference Signal Received Power (RSRP) and thresholds provided by the network node. The reporting may further comprise sending location information (e.g., geographical location, type of structure or environment in which UE is located, location relative to the network, other UEs, or a landmark, etc.) of the UE and/or sending information indicating one or more CE levels at which contention resolution failed during the access procedure.

Figure 7:
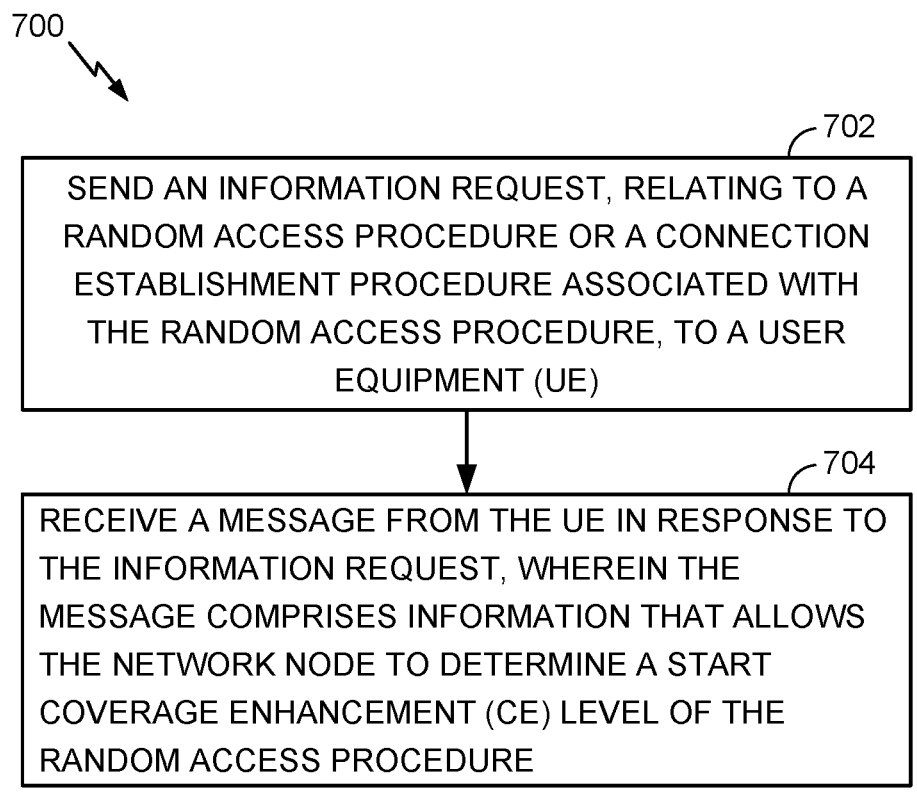
FIG. 7 is a flow diagram illustrating example operations performed by a base station for enhance information reporting by a UE, in accordance with certain aspects of the present disclosure.

FIG. 7 illustrates the steps of an enhanced RACH reporting procedure 700 performed by a network node, such as a base station in communication with a device, such as a BL/CE, eMTC, or NB-IoT UE, or an UE that is otherwise in CE mode. For example, the device may be UE 120, and the network node may be base station 110. The network node may be part of a SON. The procedure starts at 702 with an information request sent from the network to the UE, e.g., to report on a procedure. The information request may be in the form of a UE information request message. The information request may be in connection with, for example, an access procedure (e.g., random access procedure) or a connection establishment procedure (e.g., RRC connection establishment procedure). The connection establishment procedure may be associated with the access procedure because, for example, the access procedure initiates the connection establishment procedure. For example, the information request may comprise a request for a RACH report or a connection establishment failure (CEF) report (e.g., if the connection establishment procedure failed). The connection establishment failure may comprise or may be indicated by the expiration of a timer. At 704, the network node receives a message from the UE in response to the information request. The message may comprise information that allows the network node to determine (e.g., unambiguously) a start CE level of the access procedure. The message may be a report (such as a RACH report or a CEF report), and it may be in the form of a UE information response message. The message may include, for example: for example: —the starting CE level of the access procedure; —total number of random access preambles sent by the UE in a CE level at which the random access procedure was successfully completed; —how many preambles were sent at each CE level during the access procedure (e.g., the last successful access procedure); —an indication of whether contention was detected during the access procedure; —whether a contention failure occurred during the procedure (indicated by a .TRUE. flag); —or a parameter that allows the network node to deduce one or more additional parameters (e.g., a parameter that allows the network node to deduce the starting CE level of the access procedure, such as the number of preambles sent in the last configured CE level as described above), etc. The network node may determine (e.g., unambiguously) the starting CE level of the random access procedure based, at least in part, on the response message from the UE. For example, the starting CE level of a random access procedure comprises the CE level of the UE at which the UE transmitted at least one random access preamble to start the random access procedure. The random access procedure may include the UE sending random access preambles according to a scheme associated with a CE level of the UE based on measured Reference Signal Received Power (RSRP) and thresholds provided by the network node. The network node may use the information in the message to deduce at an additional parameter. The procedure may further comprise receiving location information sending location information (e.g., geographical location, type of structure or environment in which UE is located, location relative to the network, other UEs, or a landmark, etc.) of the UE and/or receiving an information element indicating one or more CE levels at which contention resolution failed during the access procedure.

As used herein, the terms "determining" or "identifying" encompass a wide variety of actions. For example, "determining" or "identifying" may include calculating, deducing, choosing, computing, processing, deciding, deriving, investigating, looking up (e.g., looking up in a table, a database or another data structure), ascertaining and the like. Also, "determining" or "identifying" may include receiving (e.g., receiving information), accessing (e.g., accessing data in a memory) and the like. Also, "determining" or "identifying" may include resolving, selecting, choosing, establishing and the like.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. One or more aforementioned devices or processors may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, or any combination thereof. If implemented in software, the software modules may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, flash memory, phase change memory, EPROM, EEPROM, CD-ROM, DVD, registers, hard disk, removable disk, other optical disk storage, magnetic disk storage, or other semiconductor or magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs usually reproduce data optically with lasers. Combinations of the above should also be included within the scope of computer-readable media.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining, means for identifying, means for deducing, means for adding, means for including, means for using, means for selecting, means for allowing, means for transmitting, means for receiving, means for sending, means for initiating, means for comparing, means for prioritizing, means for assigning, means for allocating, means for rejecting, means for restricting, means for increasing, and/or means for decreasing may include one or more processors/controllers, transmitters, receivers, antennas, and/or other modules, components, or elements of user equipment 120 and/or base station 110 illustrated in FIG. 2.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for enhanced reporting in wireless communication by a user equipment (UE), the method comprising:

receiving a request to report information in a self-organization network (SON) report, relating to a random access procedure or a connection establishment procedure associated with the random access procedure, from a network node; and in response to the received request, sending the SON report to the network node, wherein the SON report comprises information that allows the network node to determine a starting coverage enhancement (CE) level of the random access procedure, wherein the starting CE level comprises a CE level of the UE at which the UE transmitted at least one random access preamble to start a successful random access procedure.

2. The method of claim 1, wherein the UE comprises:
an enhanced machine type communication (eMTC) UE,
a narrowband Internet-of-Things (NB-IoT) UE,
a UE in coverage enhancement (CE) mode, or combinations thereof.

3. The method of claim 1, wherein the message comprises a random access channel (RACH) report.

4. The method of claim 1, wherein the information comprises the starting CE level.

5. The method of claim 1, wherein the information comprises a total number of random access preambles sent by the UE in a CE level at which the random access procedure was successfully completed.

6. The method of claim 1, wherein the random access procedure includes the UE sending random access preambles according to a scheme associated with a CE level of the UE based on measured Reference Signal Received Power (RSRP) and thresholds provided by the network node.

7. The method of claim 1, wherein the message further comprises an indication of whether contention was detected during the random access procedure and the CE level at which the contention was detected.

8. The method of claim 7, wherein the message further comprises indication of one or more CE levels at which a contention resolution failed.

9. The method of claim 1, wherein the message further comprises location information of the UE.

10. The method of claim 1, wherein the SON report comprises a random access channel (RACH) report.

11. The method of claim 1, wherein the connection establishment procedure failed, and wherein the SON report comprises a connection establishment failure report.

12. The method of claim 11, wherein the connection establishment procedure failure comprises expiration of a timer.

13. The method of claim 1, wherein the random access procedure initiates the connection establishment procedure.

14. The method of claim 1, wherein the network node is part of a self-organizing network.

15. An apparatus for enhanced reporting in wireless communication by a user equipment (UE), the apparatus comprising: at least one processor; and
memory coupled to the at least one processor, the memory comprising instructions executable by the at least one processor to cause the UE to:
receive a request to report information in a self-organization network (SON) report, relating to a random access procedure or a connection establishment procedure associated with the random access procedure, from a network node, and
in response to the received request, send the SON report to the network node, wherein the SON report comprises information that allows the network node to determine a starting coverage enhancement (CE) level of the random access procedure, wherein the starting CE level comprises a CE level of the UE at which the UE transmitted at least one random access preamble to start a successful random access procedure.

16. The apparatus of claim 15, wherein the UE comprises:
an enhanced machine type communication (eMTC) UE,
a narrowband Internet-of-Things (NB-IoT) UE,
a UE in coverage enhancement (CE) mode, or combinations thereof.

17. The apparatus of claim 15, wherein the message comprises a random access channel (RACH) report.

18. The apparatus of claim 15, wherein the information comprises the starting CE level.

19. The apparatus of claim 15, wherein the information comprises a total number of random access preambles sent by the UE in a CE level at which the random access procedure was successfully completed.

20. The apparatus of claim 15, wherein the random access procedure includes the UE sending random access preambles according to a scheme associated with a CE level of the UE based on measured Reference Signal Received Power (RSRP) and thresholds provided by the network node.

21. The apparatus of claim 15, wherein the message further comprises an indication of whether contention was detected during the random access procedure and the CE level at which the contention was detected.

22. The apparatus of claim 7, wherein the message further comprises indication of one or more CE levels at which a contention resolution failed.

23. The apparatus of claim 15, wherein the message further comprises location information of the UE.

24. The apparatus of claim 15, wherein the SON report comprises a random access channel (RACH) report.

25. The apparatus of claim 15, wherein the connection establishment procedure failed, and wherein the SON report comprises a connection establishment failure report.

26. The apparatus of claim 25, wherein the connection establishment procedure failure comprises expiration of a timer.

27. The apparatus of claim 15, wherein the random access procedure initiates the connection establishment procedure.

28. The apparatus of claim 15, wherein the network node is part of a self-organizing network.

29. An apparatus for enhanced reporting in wireless communication by a user equipment (UE), the method comprising:
means for receiving a request to report information in a self-organization network (SON) report, relating to a random access procedure or a connection establishment procedure associated with the random access procedure, from a network node; and
means for, in response to the received information request, sending the SON report to the network node, wherein the SON report comprises information that allows the network node to determine a starting coverage enhancement (CE) level of the random access procedure, wherein the starting CE level comprises a CE level of the UE at which the UE transmitted at least one random access preamble to start a successful random access procedure.

30. The apparatus of claim 29, wherein the UE comprises:
an enhanced machine type communication (eMTC) UE,
a narrowband Internet-of-Things (NB-IoT) UE,
a UE in coverage enhancement (CE) mode, or combinations thereof.

31. The apparatus of claim 29, wherein the message comprises a random access channel (RACH) report.

32. The apparatus of claim 29, wherein the information comprises the starting CE level.

33. The apparatus of claim 29, wherein the information comprises a total number of random access preambles sent by the UE in a CE level at which the random access procedure was successfully completed.

34. The apparatus of claim 29, wherein the random access procedure includes the UE sending random access preambles according to a scheme associated with a CE level of the UE based on measured Reference Signal Received Power (RSRP) and thresholds provided by the network node.

35. The apparatus of claim 29, wherein the message further comprises an indication of whether contention was detected during the random access procedure and the CE level at which the contention was detected.

36. The apparatus of claim 35, wherein the message further comprises indication of one or more CE levels at which a contention resolution failed.

37. The apparatus of claim 29, wherein the message further comprises location information of the UE.

38. The apparatus of claim 29, wherein the SON report comprises a random access channel (RACH) report.

39. The apparatus of claim 29, wherein the connection establishment procedure failed, and wherein the SON report comprises a connection establishment failure report.

40. The apparatus of claim 39, wherein the connection establishment procedure failure comprises expiration of a timer.

41. The apparatus of claim 38, wherein the random access procedure initiates the connection establishment procedure.

42. The apparatus of claim 38, wherein the network node is part of a self-organizing network.

43. A non-transitory computer-readable medium for enhanced reporting by a UE, the computer-readable medium comprising code, which when executed by at least one processor, causes the UE to:
receive a request to report information in a self-organization network (SON) report, relating to a random access procedure or a connection establishment procedure associated with the random access procedure, from a network node; and
in response to the received request, send the SON report to the network node, wherein the SON report comprises information that allows the network node to determine a starting coverage enhancement (CE) level of the random access procedure, wherein the starting CE level comprises a CE level of the UE at which the UE transmitted at least one random access preamble to start a successful random access procedure.

44. The non-transitory computer-readable medium of claim 43, wherein the UE comprises:
an enhanced machine type communication (eMTC) UE,
a narrowband Internet-of-Things (NB-IoT) UE,
a UE in coverage enhancement (CE) mode, or combinations thereof.

45. The non-transitory computer-readable medium of claim 43, wherein the message comprises a random access channel (RACH) report.

46. The non-transitory computer-readable medium of claim 43, wherein the information comprises the starting CE level.

47. The non-transitory computer-readable medium of claim 43, wherein the information comprises a total number of random access preambles sent by the UE in a CE level at which the random access procedure was successfully completed.

48. The non-transitory computer-readable medium of claim 43, wherein the random access procedure includes the UE sending random access preambles according to a scheme associated with a CE level of the UE based on measured Reference Signal Received Power (RSRP) and thresholds provided by the network node.

49. The non-transitory computer-readable medium of claim 43, wherein the message further comprises an indication of whether contention was detected during the random access procedure and the CE level at which the contention was detected.

50. The non-transitory computer-readable medium of claim 49, wherein the message further comprises indication of one or more CE levels at which a contention resolution failed.

51. The non-transitory computer-readable medium of claim 43, wherein the message further comprises location information of the UE.

52. The non-transitory computer-readable medium of claim 43, wherein the SON report comprises a random access channel (RACH) report.

53. The non-transitory computer-readable medium of claim 43, wherein the connection establishment procedure failed, and wherein the SON report comprises a connection establishment failure report.

54. The non-transitory computer-readable medium of claim 53, wherein the connection establishment procedure failure comprises expiration of a timer.

55. The non-transitory computer-readable medium of claim 43, wherein the random access procedure initiates the connection establishment procedure.

56. The non-transitory computer-readable medium of claim 43, wherein the network node is part of a self-organizing network.

57. A method for enhanced reporting in wireless communication by a network node, the method comprising:
sending a request to report information in a self-organization network (SON) report, relating to a random access procedure or a connection establishment procedure associated with the random access procedure, to a user equipment (UE); and
receiving the SON report from the UE in response to the request, wherein the SON report comprises information that allows the network node to determine a starting coverage enhancement (CE) level of the random access procedure, wherein the starting CE level comprises a CE level of the UE at which the UE transmitted at least one random access preamble to start a successful random access procedure.

58. The method of claim 57, wherein the UE comprises:
an enhanced machine type communication (eMTC) UE,
a narrowband Internet-of-Things (NB-IoT) UE,
a UE in coverage enhancement (CE) mode, or a combination thereof.

59. The method of claim 57, wherein the message comprises a random access channel (RACH) report.

60. The method of claim 57, wherein the information comprises the starting CE level.

61. The method of claim 57, wherein the information comprises a total number of random access preambles sent by the UE in a CE level at which the random access procedure was successfully completed.

62. The method of claim 57, wherein the random access procedure includes the UE sending random access preambles according to a scheme associated with a CE level of the UE based on measured Reference Signal Received Power (RSRP) and thresholds provided by the network node.

63. The method of claim 57, wherein the message further comprises an indication of whether contention was detected during the random access procedure.

64. The method of claim 63, wherein the message further comprises indication of one or more CE levels at which a contention resolution failed.

65. The method of claim 57, wherein the message further comprises location information of the UE.

66. The method of claim 57, wherein the SON report comprises a random access channel (RACH) report.

67. The method of claim 66, wherein the connection establishment procedure failed, and wherein the SON report comprises a connection establishment failure report.

68. The method of claim 67, wherein the random access procedure failure is indicated by expiration of a timer.

69. The method of claim 57, wherein the connection establishment procedure is initiated by the random access procedure.

70. The method of claim 57, wherein the network node is part of a self-organizing network.

71. An apparatus for enhanced reporting in wireless communication by a network node, the apparatus comprising: at least one processor; and
memory coupled to the at least one processor, the memory comprising instructions executable by the at least one processor to cause the network node to:
send a request to report information in a self-organization network (SON) report, relating to a random access procedure or a connection establishment procedure associated with the random access procedure, to a user equipment (UE), and
receive the SON report from the UE in response to the request, wherein the SON report comprises information that allows the network node to determine a starting coverage enhancement (CE) level of the random access procedure, wherein the starting CE level comprises a CE level of the UE at which the UE transmitted at least one random access preamble to start a successful random access procedure.

72. The apparatus of claim 71, wherein the UE comprises:
an enhanced machine type communication (eMTC) UE,
a narrowband Internet-of-Things (NB-IoT) UE,
a UE in coverage enhancement (CE) mode, or a combination thereof.

73. The apparatus of claim 71, wherein the message comprises a random access channel (RACH) report.

74. The apparatus of claim 71, wherein the information comprises the starting CE level.

75. The apparatus of claim 71, wherein the information comprises a total number of random access preambles sent by the UE in a CE level at which the random access procedure was successfully completed.

76. The apparatus of claim 71, wherein the random access procedure includes the UE sending random access preambles according to a scheme associated with a CE level of the UE based on measured Reference Signal Received Power (RSRP) and thresholds provided by the network node.

77. The apparatus of claim 71, wherein the message further comprises an indication of whether contention was detected during the random access procedure.

78. The apparatus of claim 77, wherein the message further comprises indication of one or more CE levels at which a contention resolution failed.

79. The apparatus of claim 71, wherein the message further comprises location information of the UE.

80. The apparatus of claim 71, wherein the SON report comprises a random access channel (RACH) report.

81. The apparatus of claim 80, wherein the connection establishment procedure failed, and wherein the SON report comprises a connection establishment failure report.

82. The apparatus of claim 81, wherein the random access procedure failure is indicated by expiration of a timer.

83. The apparatus of claim 71, wherein the connection establishment procedure is initiated by the random access procedure.

84. The apparatus of claim 71, wherein the network node is part of a self-organizing network.

85. An apparatus for enhanced reporting in wireless communication by a network node, the apparatus comprising:
means for sending a request to report information in a self-organization network (SON) report, relating to a random access procedure or a connection establishment procedure associated with the random access procedure, to a user equipment (UE); and
means for receiving the SON report from the UE in response to the request, wherein the SON report comprises information that allows the network node to determine a starting coverage enhancement (CE) level of the random access procedure, wherein the starting CE level comprises a CE level of the UE at which the UE transmitted at least one random access preamble to start a successful random access procedure.

86. The apparatus of claim 85, wherein the UE comprises:
an enhanced machine type communication (eMTC) UE,
a narrowband Internet-of-Things (NB-IoT) UE,
a UE in coverage enhancement (CE) mode, or a combination thereof.

87. The apparatus of claim 85, wherein the message comprises a random access channel (RACH) report.

88. The apparatus of claim 85, wherein the information comprises the starting CE level.

89. The apparatus of claim 85, wherein the information comprises a total number of random access preambles sent by the UE in a CE level at which the random access procedure was successfully completed.

90. The apparatus of claim 85, wherein the random access procedure includes the UE sending random access preambles according to a scheme associated with a CE level of the UE based on measured Reference Signal Received Power (RSRP) and thresholds provided by the network node.

91. The apparatus of claim 85, wherein the message further comprises an indication of whether contention was detected during the random access procedure.

92. The apparatus of claim 91, wherein the message further comprises indication of one or more CE levels at which a contention resolution failed.

93. The apparatus of claim 85, wherein the message further comprises location information of the UE.

94. The apparatus of claim 85, wherein the SON report comprises a random access channel (RACH) report.

95. The apparatus of claim 94, wherein the connection establishment procedure failed, and wherein the SON report comprises a connection establishment failure report.

96. The apparatus of claim 95, wherein the random access procedure failure is indicated by expiration of a timer.

97. The apparatus of claim 85, wherein the connection establishment procedure is initiated by the random access procedure.

98. The apparatus of claim 85, wherein the network node is part of a self-organizing network.

99. A non-transitory computer-readable medium for enhanced reporting by a network node, the computer-readable medium comprising code, which when executed by at least one processor, causes the network node to:
send a request to report information in a self-organization network (SON) report, relating to a random access procedure or a connection establishment procedure associated with the random access procedure, to a user equipment (UE); and
receive the SON report from the UE in response to the request, wherein the SON report comprises information that allows the network node to determine a starting coverage enhancement (CE) level of the random access procedure, wherein the starting CE level comprises a CE level of the UE at which the UE transmitted at least one random access preamble to start a successful random access procedure.

100. The non-transitory computer-readable medium of claim 99, wherein the UE comprises:
an enhanced machine type communication (eMTC) UE,
a narrowband Internet-of-Things (NB-IoT) UE,
a UE in coverage enhancement (CE) mode, or a combination thereof.

101. The non-transitory computer-readable medium of claim 99, wherein the message comprises a random access channel (RACH) report.

102. The non-transitory computer-readable medium of claim 99, wherein the information comprises the starting CE level.

103. The non-transitory computer-readable medium of claim 99, wherein the information comprises a total number of random access preambles sent by the UE in a CE level at which the random access procedure was successfully completed.

104. The non-transitory computer-readable medium of claim 99, wherein the random access procedure includes the UE sending random access preambles according to a scheme associated with a CE level of the UE based on measured Reference Signal Received Power (RSRP) and thresholds provided by the network node.

105. The non-transitory computer-readable medium of claim 99, wherein the message further comprises an indication of whether contention was detected during the random access procedure.

106. The non-transitory computer-readable medium of claim 105, wherein the message further comprises indication of one or more CE levels at which a contention resolution failed.

107. The non-transitory computer-readable medium of claim 99, wherein the message further comprises location information of the UE.

108. The non-transitory computer-readable medium of claim 99, wherein the SON report comprises a random access channel (RACH) report.

109. The non-transitory computer-readable medium of claim 108, wherein the connection establishment procedure failed, and wherein the SON report comprises a connection establishment failure report.

110. The non-transitory computer-readable medium of claim 109, wherein the random access procedure failure is indicated by expiration of a timer.

111. The non-transitory computer-readable medium of claim 99, wherein the connection establishment procedure is initiated by the random access procedure.

112. The non-transitory computer-readable medium of claim 99, wherein the network node is part of a self-organizing network.

* * * * *